United States Patent [19]

Garrett et al.

[11] Patent Number: 4,995,892
[45] Date of Patent: Feb. 26, 1991

[54] PROCESS AND APPARATUS FOR CONTROLLING THE THERMAL ENVIRONMENT OF GLASS FIBER FORMING

[75] Inventors: Jeffrey L. Garrett, Lexington; Harry Makitka, Clemmons; Richard J. Sanchez; Gregory W. Shepler, both of Lexington, all of N.C.

[73] Assignee: PPG Industries, Inc., Pittsburgh, Pa.

[21] Appl. No.: 452,866

[22] Filed: Dec. 19, 1989

[51] Int. Cl.$^5$ .................. C03B 37/02; C03B 37/07
[52] U.S. Cl. .......................... 65/12; 65/29; 65/162; 65/356; 165/37; 165/40; 165/104.32
[58] Field of Search ............... 65/2, 12, 29, 356, 162; 165/104.32, 11.1, 34, 37, 40

[56] References Cited

U.S. PATENT DOCUMENTS

| | | | |
|---|---|---|---|
| 2,634,553 | 4/1953 | Russell | 49/17 |
| 2,908,036 | 10/1959 | Russell | 18/8 |
| 2,947,028 | 8/1960 | Slayter | 18/8 |
| 3,251,665 | 5/1966 | Bour | 65/2 |
| 3,426,837 | 2/1969 | Moore et al. | 165/104.32 X |
| 3,647,382 | 3/1972 | Tilbrook | 65/12 |
| 3,695,858 | 10/1972 | Russell | 65/2 |
| 3,746,525 | 7/1973 | Kasuga et al. | 65/12 |
| 3,759,681 | 9/1973 | Russell | 65/12 |
| 3,868,494 | 2/1975 | Pepin | 219/341 |
| 4,059,145 | 11/1977 | Ruble | 165/1 |
| 4,566,890 | 1/1986 | Hostler et al. | 65/12 |
| 4,589,898 | 5/1986 | Beaver | 65/12 |
| 4,728,485 | 3/1988 | Ruiz | 165/104.32 X |
| 4,753,285 | 6/1988 | Rawlings | 165/104.32 X |
| 4,824,457 | 4/1989 | Jensen | 65/12 |

OTHER PUBLICATIONS

"Superchanger ® Plate and Frame Heat Exchangers for HVAC System Applications", TRANTER ® Corp., Witchita Falls, Tex.

"Parts List, Indicating Controllers", SYBRON/Taylor Instruments Company.

"Series One TM Family Programmable Controllers", G. E. Fanuc Automation.

"Series One TM Plus Programmable Controller", General Electric Co.

"CIM-PAC TM Data Acquisition & Control Application Software", Action Instruments, San Diego, Calif.

Primary Examiner—Robert L. Lindsay
Attorney, Agent, or Firm—Richard E. Maebius

[57] ABSTRACT

The subject matter of this invention relates to an improved method for controlling an industrial glass fiber-forming process. More particularly, it involves a method for controlling the thermal environment of several fiber glass bushing assemblies by the utilization of fin cooler assemblies in which a coolant is passed through the fins as part of a closed-loop pressurized system to remove heat radiated to the fins by the molten glass that emerges from the bushing. In the preferred embodiment, this liquid coolant is demineralized water operating at a pressure of somewhere between 18 and 100 psi.

The use of a programmable logic controller to monitor various system parameters such a pressure, temperature and flow rate is also disclosed. The controller is programmed to take corrective action automatically upon the detection of certain triggering events in order to maintain a constant flow of coolant throughout the entire system. As a last resort, means are provided for injecting an emergency supply of cooling water to continuously flush the system and prevent mechanical distortion and possible rupturing of the fins.

14 Claims, 5 Drawing Sheets

PROCESS AND APPARATUS FOR CONTROLLING THE THERMAL ENVIRONMENT OF GLASS FIBER FORMING

The present invention relates to an improved method for controlling an industrial glass fiber forming process. More particularly, the present invention relates to an improved method for controlling the thermal environment of several fiber glass bushings by the utilization of fin cooler assemblies and fins having continuous flow channels to permit the passage of a liquid coolant therein. Still more particularly, the instant invention relates to a method for cooling glass fibers utilizing a liquid coolant which passes continuously through the above-mentioned fin coolers in a closed-loop pressurized system. In the preferred embodiment of the instant invention, the liquid coolant is demineralized water operating at a closed system pressure of between 18 and 100 psi. Since the demineralized water enters the fin coolers at a pressure of at least 25 psi, its boiling point is raised from a temperature of 212° F., as it would be at normal atmospheric pressure, to a boiling temperature of about 266° F. If the liquid cooling water enters the fins at a pressure of 100 psi, then its boiling point rises to about 338° F. This permits the fins to operate at higher temperatures, i.e., greater than 150° F., which prolongs their life by reducing fouling from the condensation of corrosive products such as glass volatiles which are present in the near tip plate environment.

BACKGROUND OF THE INVENTION

Glass filaments or fibers are typically formed by flowing molten glass through a large number of closely spaced orifices or tips located in the bottom of a heated container. Such containers, referred to in the art as bushings, may have as many as 2,000, 4,000 or even up to 6,000 individual glass fiber tips. The molten glass which flows through these tips must be cooled in a controlled fashion so that the glass fibers which are ultimately formed will have substantially uniform diameters.

In the past, a plurality of generally solid, planar, elongated elements, known as cooling fins were placed beneath the bushing tip plate and extended across its width. The fins were oriented and spaced so that usually one to two parallel rows of tips could easily be accommodated between them. This allowed the immediate cooling of the glass fibers as they emerged from the tips or orifices of the bushing. Upon their discharge into the atmosphere, the individual streams of glass would neck down, as determined by their viscosity and surface tension characteristics, to form a cone-like body of glass from which the fiber was drawn or attenuated. The term "cone" as used herein designates the shape assumed by the molten glass in the zone immediately below the tip or orifice from which the glass emerges. In a mathematical sense, this shape might be more accurately visualized as that of a decaying exponential. Observations and experiments indicated that heat losses from the cone were affected by radiative heat transport as well as by convection. It is believed that most radiation losses occur in the region immediately below the tip exit, in other words, at the base of the cone where the glass has its brightest glow and highest temperature. Accordingly, when the fins were placed near the glass cones emerging from the tips, heat transfer by way of radiation could be controlled and manipulated.

The heat radiated to these usually solid flat metal cooling fins of the prior art was conducted along them to a header block where one end of the fin was attached, usually by welding or brazing. The header block was typically provided with flow channels through which a coolant such as ordinary plant process water passed. This kept the fins at a relatively low temperature near their junction with the header block. The free end of the fins, on the other hand, was usually substantially warmer than the one in contact with the header block. This gave rise to a large front-to-back temperature variation or gradient along the surface of the fin.

With the advent of longer and wider bushing assemblies having as many as 6,000 or more individual tips, heat removal has become more difficult. Cooling fins have been made longer so as to extend across the width of these larger bushings. This increase in fin length has resulted in even higher surface temperatures at the free end of the fins than heretofore seen in industrial applications. This has led to excessive oxidation of the fin surface and the distortion of the free end of the fins which has resulted in a shorter life of the fin cooler assemblies. In industrial processes, as many as 3 to 8 fin cooler assemblies each having anywhere from 9 to 16 individual fins are required for each bushing assembly.

Fine textile quality fiber glass strand products typically require especially higher levels of product uniformity than the strand products used to produce rovings for resin reinforcement purposes. Textile glass fiber strands are used to manufacture cloth for use as a reinforcing laminate employed in electrical printed circuit boards or for manufacturing decorative fabrics. The use of solid fin coolers did not provide the desired uniformity to textile fibers in many instances or on any kind of a predictable basis. Furthermore, since the cooling capabilities of the solid fins are limited, forming tensions for textile fibers tended to be high and the glass throughput from the bushings relatively low.

Attempts have been made to provide fin cooler assemblies in which the individual fins contained hollow channels or passages so that plant cooling water could be passed through them to help maintain front-to-back temperature uniformity. Exemplary prior art references which disclose such fins can be found in U.S. Pat. Nos. 3,251,665 (Bour); 3,695,858 (Russell); 3,746,525 (Kasuga, et al.); and 4,824,457 (Jensen). Several problems tended to be associated with these earlier attempts at developing water-cooled fins, however.

First, the flow of ordinary plant process water through the fins resulted in fin surface temperatures which were unacceptably low, i.e, temperatures in the range of 70° F. to 100° F. on some portions of the fins. These low temperatures caused glass volatiles such as boron oxide, sodium borate, and hydrofluoric acid which are present in the moist environment near the tip plate of the bushing to condense out onto the surface of the fins thereby causing unacceptably high rates of corrosion that considerably reduced the life of the fin. Also, localized contaminant buildup on the surface of the fins altered their local radiative heat transfer characteristics thereby creating non-uniformity in the diameters of glass fibers produced from the same rows of tips. These low fin temperatures also allowed the glass volatiles to mix with water in the moist environment immediately adjacent to the bushing which resulted in the formation of corrosive acids that further reduced fin life. Secondly, the use of ordinary plant process cooling water or ethylene glycol solutions which were not completely free of entrained solid particles and other contaminants created additional problems. As this water continuously flowed through the relatively small passageways in the fins, the passages often tended to become plugged, blocked or occluded. This blockage often rendered the fin inoperative. Due to the presence of heat being constantly radiated onto the surface of the fin from the molten glass cones and the bushing tip plate as well, this flow blockage may be accompanied by a localized increase in coolant pressure due to boiling and the subsequent vaporization of the coolant inside the fin. This, in turn, could lead to mechanical distortion or, under extreme circumstances, localized rupture of the fin itself.

Thus, there exists a need in glass fiber-forming to consistently maintain the surface temperature of the fin cooler assemblies at a sufficiently high enough temperature to prevent the condensation of glass volatiles onto the surface of the fin thereby degrading fin efficiency and shortening fin life. There also exists a need to maintain a substantially uniform axial temperature distribution along the length of each fin. There also exists a need to accomplish these above-mentioned objectives in a practical manner and on an industrial scale. There also exists the need to maintain the continuous flow of coolant throughout the fin cooler system in the event of an emergency such as an interruption in coolant flow so as to prevent any subsequent fin distortion or possible localized rupturing which may occur. There also exists a need to provide a means for automatically monitoring and controlling such a system on an industrial scale.

SUMMARY OF THE INVENTION

The present invention relates to an improved method for cooling glass fibers formed from molten glass supplied to a plurality of heated fiber glass bushing assemblies. Cooling of the fibers is accomplished by the extraction of heat radiated from the fibers to the primary side of a closed-loop pressurized cooling system having at least one fin cooler assembly per bushing. Each fin cooler has a header block and a plurality of individual fins attached thereto. Both the header block and the fins also have a continuous passageway to permit the flow of a primary coolant such as demineralized water through them. Heat radiated to the surface of each fin is transferred to the coolant and subsequently removed by at least one heat exchanger to a secondary flow of coolant. The primary coolant is pumped through the fin coolers at a pressure greater than one atmosphere so as to prevent boiling and maintain a flow rate sufficient to keep the surface temperature distribution of each fin substantially constant along its length. Various parameters are monitored and the process is controlled by means of a programmable logic controller (hereinafter referred to simply as a "PLC"). For example, the temperature of the coolant exiting the fin cooler assemblies is electronically monitored at a location downstream of the heat exchanger. The PLC then compares this temperature to a range of pre-programmed temperatures and produces a second electrical signal used to adjust the flow rate of coolant through the secondary side of the heat exchanger by means of a pneumatically controlled valve so as to maintain the temperature of the primary coolant wIthIn the prescribed range of pre-programmed temperatures.

The instant invention also contemplates the use of an apparatus designed to maintain the continuous flow of coolant through the primary side of the system. In the preferred embodiment, a source of compressed air, at least one compressed air-driven pump, and means for monitoring the supply of electrical power to the primary pumps used to maintain flow through the primary loop of the cooling system is contemplated. The detection of an interruption in the supply of electrical power to the primary pumps causes an electrically operated valve to fail and open to admit the compressed air into the air-driven pump thereby maintaining a substantially constant flow of coolant throughout the system. Also contemplated is the use of an internal combustion engine-driven pump started at about the same time compressed air is admitted to the air-driven pump to help maintain this continuous flow of coolant. As a last resort, means are provided for automatically injecting a supply of emergency cooling water to maintain a continuous flow of coolant through the fins in an attempt to avoid potential mechanical distortion and possible rupture.

DETAILED DESCRIPTION OF THE DRAWING

Figure 1:
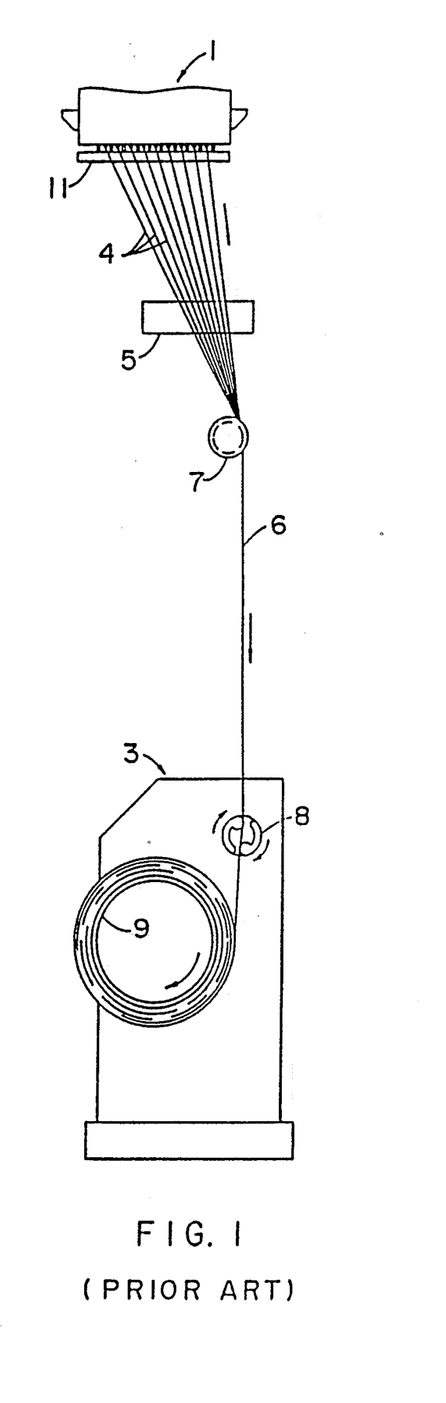
FIG. 1 is a side elevational view of a conventional fiber glass forming process showing a bushing, an applicator and a winder.
Figure 2:
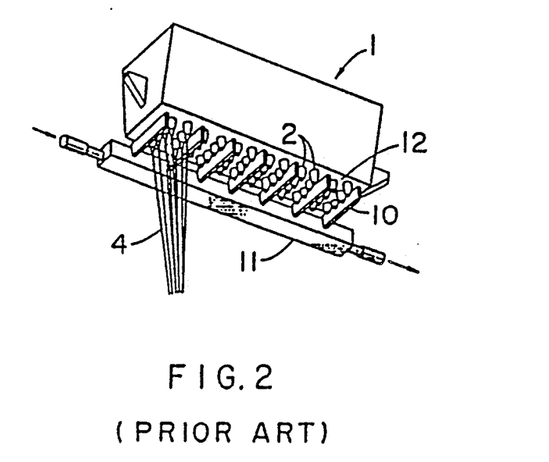
FIG. 2 is a perspective view of the bushing, a fin cooler assembly typical in the prior art, individual tips and fiber emerging therefrom.

With reference now to the drawings, FIGS. 1 and 2 illustrate a conventional process for the production of glass fibers wherein molten glass is fed into the top of a bushing assembly (1) and exits from a plurality of tips or orifices (2) to form individual glass cones or jets which are then cooled and attenuated. The drawing force for the attenuation of the cone or jet into an individual glass filament may be supplied by an appropriately powered rotating winder (3).

The individual glass fibers or filaments (4) (hereinafter referred to simply as "fibers"), once they have been sufficiently cooled so as to substantially solidify, are contacted with a roller applicator (5) which coats them with a liquid chemical sizing composition. The sizing composition helps to impart lubricity to the individual fibers and also usually contains a binder which provides a bonding agent. The chemical characteristics of the sizing composition and binder are such that they are compatible with the intended end use of the fibers.

The fibers (4) drawn from the bushing (1) are gathered into single or multiple strands (6) by passing a plurality of individual fibers (4) over a gathering shoe (7). The gathering shoe (7) is typically a graphite cylinder or disc having cut therein a plurality of grooves about its circumference. The number of grooves is equal to the number of individual strands to be formed from a single bushing. The strand (6) is then wound over a rotating spiral (8) and onto a cardboard forming tube (9) which is rotated by an appropriately powered winder (3). The winder (3) may cause either the forming tube (9), spiral (8), or both to reciprocate back and forth along their axis of rotation so that the strand (6) passing over the spiral (8) is wound evenly along the length of the forming tube (9). Cooling fins (10) are inserted between parallel rows of tips (2) with one end of each fin being attached to a manifold or header block (11) through which a cooling fluid, such as water, is pumped. The fins (10) are positioned so as to absorb heat radiated from the individual glass cones exiting the tips and conduct it to the header block (11) where it is removed by the cooling fluid. The fins also remove some heat radiated by the tip plate (12).

In the fiberization of glass, three characteristics must be considered: One is the slope of the viscosity-temperature curve of the glass in its fiberization range and above. If the slope is relatively steep, the temperature range for forming fibers will be extremely narrow and it will be extremely difficult to form a fiber within the short time interval that attenuation takes place. The solid fins utilized in the prior art helped to achieve the necessary temperature range for fiberization in the environment beneath the tip. It can be seen that by providing a uniform temperature distribution along the length of an individual fin that this temperature range may be more readily maintained across the entire width of the bushing tip plate.

The second factor which must be considered in fiberization is the liquidus temperature of the glass. If the liquidus temperature is high, then the glass temperature inside the bushing must be elevated to a point where its viscosity is critically near the borderline or even outside of the viscosity range within which fiberization can occur. Under these conditions, the use of fins can cool the glass to within a fiberizable viscosity range shortly upon its emission from the tips even though the initial exit temperature and fluidity of the glass is incapable of fiberization. Without the use of such fins, the glass cannot cool at a sufficient rate to permit the establishment of a continuous fiber. In other words, the surface tension of the glass may cause a constriction or beading of glass near the tips and possibly flood the tip plate thereby preventing the attenuation of continuous fibers. By utilizing a fin having a uniform temperature distribution, this condition is prevented from occurring by insuring that the temperature distribution along rows of individual tips is kept constant.

The third characteristic important in the fiberization of glass is the rate of devitrification. If the rate of devitrification is high and the glass is cooled too slowly, the glass may form an undesirable crystalline phase. By the use of fins, however, glasses having high rates of devitrification may be cooled rapidly upon their emission from the tips and solidified well before even partial devitrification has time to occur. Therefore, the use of fins having a uniform temperature distribution prevents this problem from arising along rows of tips.

Figure 3:
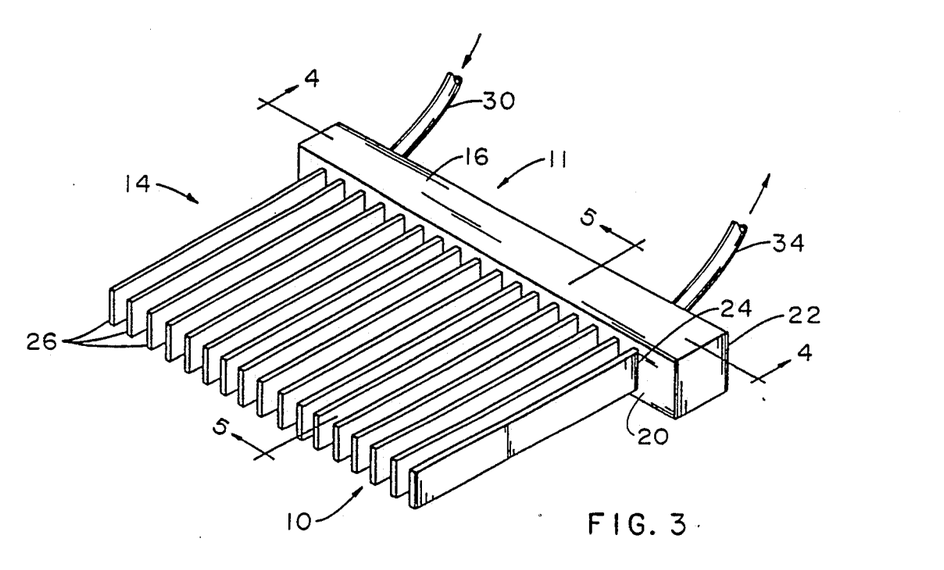
FIG. 3 shows, in perspective, a typical liquid-cooled fin cooler assembly.

Referring now to FIG. 3, there is shown in perspective a fin cooler assembly (14). The fin cooler includes a header block (11) to which are attached a plurality of outwardly extending fins (10). The header block (11) is generally an elongated rectangular bar having a top surface (16), an opposed bottom surface (18), a front face (20), and an opposed rear face (22). Each of the fins (10) is attached at a first end (24) to the front face (20) of the header block (11) in any conventional manner, such as by welding or brazing, and extends outwardly therefrom in a cantilever fashion to a second, terminal free end (26).

Figure 4:
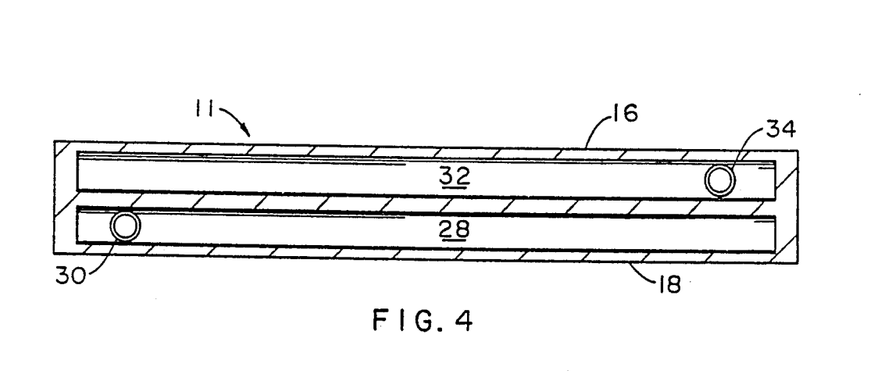
FIG. 4 shows an elevational view of the header block of the fin cooler assembly of FIG. 3 looking into section 4—4.
Figure 5:
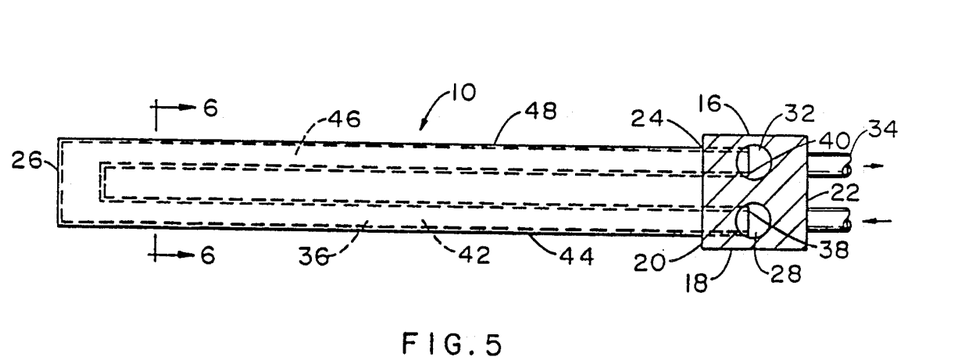
FIG. 5 is a side elevational view of a typical fin shown looking into section 5—5 of FIG. 3.

As may be seen in FIGS. 4 and 5, the header block (11) includes a pair of separate, elongated coolant flow channels. A coolant inflow channel (28) is formed in the interior of header block (11) and extends throughout its length. A coolant inflow line (30) is secured to header block (11) and supplies coolant to the inflow channel (28). A separate coolant outflow channel (32) is formed in header block (11) and also extends throughout the length of header adjacent to the top surface (16) thereof. The inflow (28) and outflow (30) channels are generally parallel to one other but are completely separate. An outlet line (34), in fluid communication with the outflow channel (32), provides means for coolant egress from the header block (11).

Referring again to FIG. 5, each cooling fin (10) is provided with an elongated generally U-shaped flow passage (36). This flow passage (36) in each cooling fin (10) has an inlet port (38) in communication with the liquid inflow channel (28) of the header block (11). An outlet port (40) of each flow passage (36) is also disposed in communication with the outlet channel (32) of the header block (11). The flow passage (36) in each cooling fin (10) extends from the first end (24) of the fin along a lower leg (42) to the free end (26) of the fin and then back through a top leg (46) and returned to the first end of the fin (10). Liquid flows into the header block inflow channel (28) and into the lower leg (42) of the flow passage (36) through inlet port (38). The liquid flows outwardly to the free end (26) of fin (10) and then returns through the top leg (46) of the flow passage (36), through outlet port (40) and into the outflow channel (32) of the header block (11). While the inflow channel (28) and outflow channel (32) are not in direct fluid communication with one another, they are, in fact, in indirect communication with one another by way of the liquid flow passage (36) in each of the cooling fins (10) attached to the header block (11).

Figure 6:
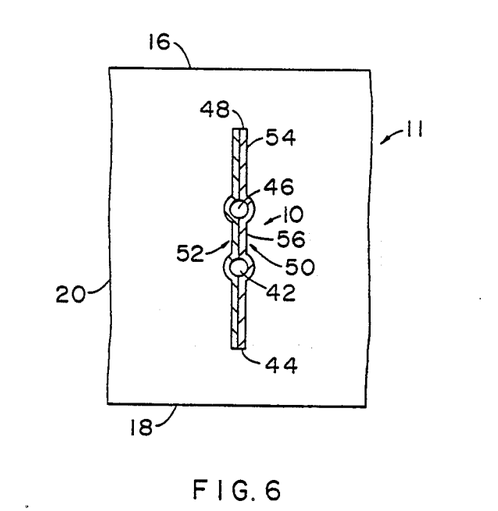
FIG. 6 is a cross-sectional view of the fin shown in FIG. 5 looking into section 6—6.

A preferred structure of a typical cooling fin (10) is shown in FIG. 6 as being comprised of two similar, but opposed stamped metal panels (50) and (52), each of which is formed as one side of the cooling fin (10). Each stamped panel includes a generally elongated U-shaped recess. When the two panels (50) and (52) are placed together and joined one another by securement of peripheral and intermediate flange sections (54) and (56), respectively, by welding or the like, there is formed a cooling fin (10) having an integrally formed flow passage (36) therein.

Figure 7:
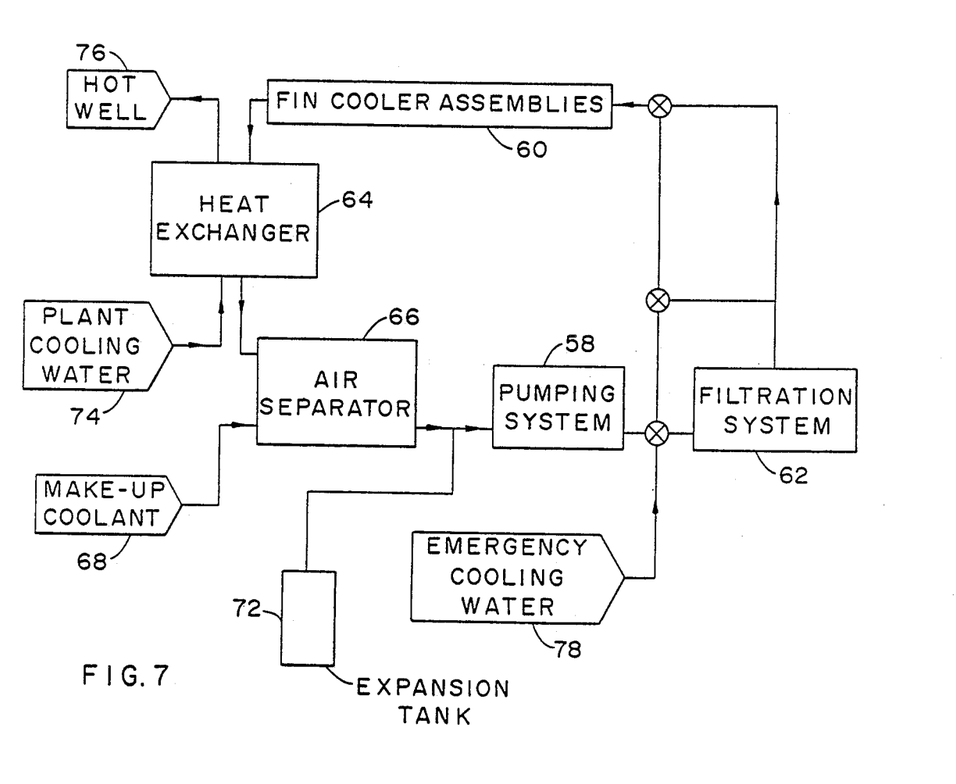
FIG. 7 depicts in block diagram form the pressurized closed-loop cooling system used to regulate the rate of heat transfer from the fin cooler assemblies.

FIG. 7 depicts, in block diagram form, the closed-loop pressurized cooling system which is the subject matter of the instant invention. A liquid coolant, preferably between 1200 and 1500 gallons of demineralized water, is continually pumped through the primary side of the closed-loop pressurized cooling system. Pumping means (58), which will be further described in detail, are used to provide a continuous supply of liquid coolant to anywhere from 600 to 700 individual fin cooler assemblies (60). The coolant enters the header block at a pressure somewhere between 25 and 100 psi, but preferably at about 50 psi. As used herein, it is to be understood that the designation "psi" is meant to indicate the gauge pressure (psig) above atmosPheric pressure and not the absolute pressure (psia). The fin coolers are located directly beneath the bushing tip plates as described previously. Heat radiated from the bushing, as well as the glass cones emerging from the tips thereof, is transferred away by the extended fin members (10) through which coolant continually circulates at a rate somewhere between 0.10 and 0.30 gpm/fin but preferably at about 0.15 gpm/fin and the heat is thereby extracted. The fin surface temperature is maintained at a uniform temperature of at least 150° F. The coolant exiting the pumps may first pass through a filtration system (62). In the filtration system, at least one number 100-mesh (127 micron) strainer lining a perforated stainless steel basket is used through which all of the primary coolant flow from the pumping system (58) passes to remove any particulate contamination from the coolant prior to its entrance into the fin cooler assemblies (60). In the preferred embodiment, two strainers are used so that the flow of primary coolant may be passed through either one individually or both simultaneously. The filtration system may also be bypassed entirely for maintenance purposes or in the event of an emergency such as the clogging of both strainers. The liquid coolant then passes through the fin cooler assemblies (60), described in detail above, and heat is extracted by the individual cooling fins. The heated coolant then exits the fin cooler assemblies, passes through at least one conventional counterflow heat exchanger (64), and is returned to the pumping system (58) by means of an air separator (66). A source of make-up coolant (68) is also provided and injected into the primary loop by means of a wafer-type, spring-loaded check valve (70) that opens automatically if the supply side pressure of the make-up coolant (68) exceeds that of the primary side coolant. A thermal bladder-type expansion tank (72) is also provided on the inlet side of the pumping system (58) in order to accommodate changes in fluid volume due to changes in the primary loop coolant temperature. A separate flow of ordinary plant cooling water (74) is supplied to the secondary side of the heat exchanger to extract heat from the primary coolant loop. This heated secondary side water then passes from the heat exchanger (64) to a hot well reservoir (76) remote from the immediate industrial facility. This water is then eventually cooled in the well or by means of a separate cooling tower and recirculated through the secondary side of the heat exchanger as ordinary plant process water.

In the preferred embodiment of the instant invention, expandable plate and frame-type counterflow heat exchangers such as the Superchanger Model No. UX-426-HP-68 available from the Tranter Corporation of Wichita Falls, Tex. were used. The heat exchangers in the instant invention were each sized to have a total available heat transfer surface area of approximately 540 sq. ft. and are capable of continuously cooling a primary side flow rate of up to 900 gpm from about 160° F. to 150° F. using a constant secondary side flow of about 210 gpm. Although the heat exchangers used in the preferred embodiment of the instant invention are liquid cooled, expandable counterflow heat exchangers, it should be clear that parallel flow heat exchangers may also be used and that natural or forced air convection may be used instead of a liquid coolant to remove heat from the primary to the secondary side of the exchanger. Also, in the preferred embodiment, two such heat exchangers are used, each unit being sized to adequately handle the heat exchange requirements of the entire primary side cooling system independent of one another. This allows one unit to operate alone with the other standing ready for back-up in the event of an emergency or preventive maintenance purposes.

A centrifugal flow air separator (66) such as the Model RL-8 SS Rolairtrol unit available from Bell & Gossett Corporation of Morton Grove, Ill. having a handling capacity of about 1300 gpm is used to return the primary coolant to the pumping system. The primary coolant enters the top of the cylindrically shaped air separator and swirls in a kind of vortex motion toward the bottom where it exits the unit. This deaerates any entrained air that may be entrapped within the primary loop or degassed out of the liquid coolant as it is heated. Any air which is separated from the primary flow is vented to the atmosphere by means of a conventional relief valve.

The make-up coolant, in this case, demineralized water, is automatically injected into the primary loop directly through the air separator (66). Since demineralized water is used as the primary coolant in the preferred embodiment of the instant invention, the make-up coolant supply is processed by passing ordinary municipal water through a demineralization bed. This demineralization bed, well understood by those skilled in the chemical arts, comprises a plurality of mixing tanks as well as a colloidal filter tank to remove sediment, an anion and cation filter tank to remove positive and negative ions, and a carbon filter tank to remove nonionic organic materials and bacteria from the municipal water supply source. This make-up coolant is provided at a supply pressure of about 40 psi and reduced by means of a conventional pressure reducing valve to about 18 psi. As mentioned previously, a wafer-type, spring-loaded check valve opens automatically to admit make-up coolant into the primary loop through the air separator (66) if the system pressure drops below about 16 to 18 psi. A flow switch (65) is also provided and the PLC activates an alarm (67) if more than ⅛ gpm of make-up coolant is released into the primary side. A pressure transducer (not shown) may also be provided and monitored by the PLC so that if the pressure of the make-up coolant falls below about 16 psi, a solenoid valve (126) is opened and emergency coolant is flushed into the system.

A 317-gallon capacity bladder-type thermal expansion tank (72), also available from Bell & Gossett, is provided on the primary side of the system to accommodate any thermal expansion of the primary coolant. The air pressure inside the bladder is maintained at about 18 psi. The use of a thermal expansion tank is particularly important to accommodate the thermal expansion and contraction of primary loop coolant which, in a closed system such as this employing between 1200 and 1500 gallons of liquid coolant, can be quite considerable. The thermal expansion tank also helps maintain a constant pressure on the inlet side of the pumping system (58).

Figure 8:
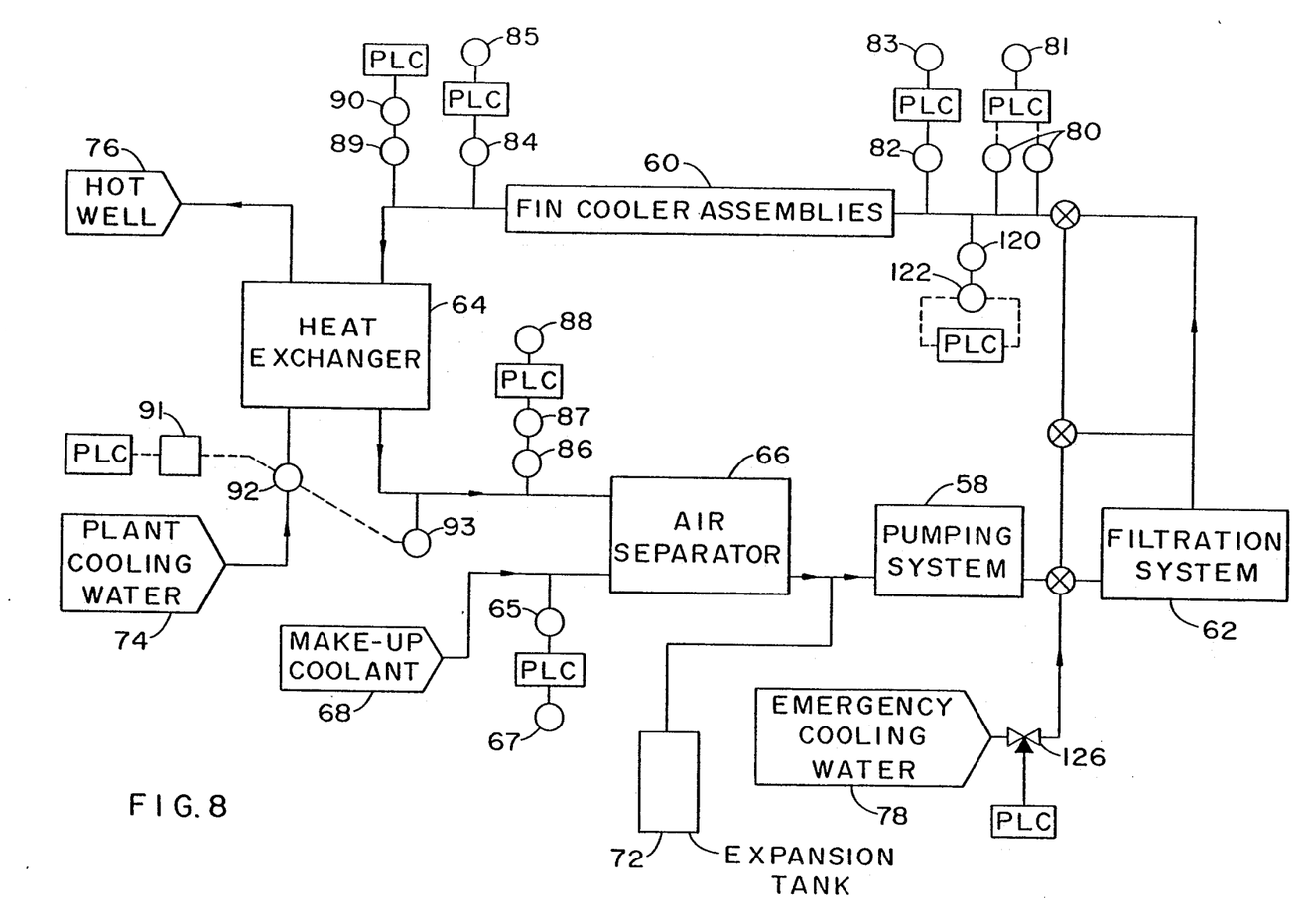
FIG. 8 depicts, in more detailed form, the location of the various pressure, flow, and temperature transducers used to monitor the system.

FIG. 8 shows the location of the various transducers used in conjunction with a programmable logic controller to monitor and control the operation of the system. The programmable logic controller is used to monitor various process parameters such as temperature, pressure, and flow rate. The improved capabilities of PLC's available today for industrial process control go far beyond earlier versions which simply emulated relay switching functions according to discrete on-off signals. Modern PLC's are capable of accepting continuously variable analog signals from process measuring devices and transducers. They can also develop continuously variable analog output signals. These signals can be used to operate regulators such as current-to-pneumatic or current-to-pressure transducers that can open or close pneumatic control valves or positioners. Some PLC's can also provide mathematical computational capabilities.

In the instant invention, a Series One (TM) Plus GE-FANUC programmable controller, available from the General Electric Corporation, was used; however, any other programmable logic controller capable of performing substantially the same operations as described herein may also be substituted. For example, similar PLC's are available from a variety of manufacturers such as Allen-Bradley, Gould-Modicon, Texas Instruments, Westinghouse and Mitsubishi, all of which may be programmed to function as described in further detail below.

Also the control system used herein incorporated additional data acquisition software to provide pictorial representations of the status of the closed-loop cooling system on a color cathode ray tube (CRT) terminal. In particular, a commercially available software package known as CIM-PAC (TM) produced by Action Instruments of San Diego, Calif. was used.

A mechanically activated electrical pressure switch (80) is used to provide an indication of a low system pressure in the primary feed to the fin cooler assemblies (60). This switch is set to trip and close at a pressure of about $\frac{2}{3}$ that at which the primary coolant is supplied to the header blocks of the fin coolers (60), this usually being about 50 psi. In the preferred embodiment, two such pressure switches are provided for purposes of redundancy in the event that one of the switches fails to close. Should either of the pressure switches close, the PLC will activate an annunciator (81). This low pressure alarm may indicate that primary coolant is being lost through leakage faster than the rate at which make-up coolant can be provided which is about 7 gpm. Low pressure may also result from failure of the electric motors (98) used to drive the primary pumps (96). In this event, the PLC would automatically activate the back-up compressed air and natural gas driven pumps (106) and (116). If these back-up pumps were also unavailable, then the PLC would automatically open a supply of emergency cooling water (78) and flood the entire primary side of the system. This pumping system will be described in further detail below.

A pressure transducer (82) is also used to monitor the system pressure in the cold leg of the primary loop prior to the point at which the coolant enters the fin cooler assemblies (60). An analog electrical signal generated from this transducer is provided to the PLC which activates an alarm (83) upon measuring a preprogrammed pressure within the range of about 45 and 55 psi. A second pressure transducer (84) located on the exit side of the fin cooler assemblies is also electronically monitored by the PLC. A second alarm (85) is activated if the PLC calculates a pressure differential within the range of 19 to 30 psi between the inlet and exit side of the fin coolers (60). A large pressure differential here could indicate the possibility of clogging or some other flow restriction.

A resistance-type temperature detector (86) and a transmitter (87) are used to electronically monitor the temperature of the primary side coolant exiting the heat exchangers (64). The PLC monitors this temperature and activates an alarm upon the detection of a temperature greater than about 160° F. or less than about 140° F. A second resistance-type temperature detector (89) and transmitter (90) is also used to electronically monitor the hot leg or inlet side temperature of the primary loop to the heat exchangers (64). The signal from both thermocouples can be subtracted by the PLC to calculate the temperature differential between the inlet and outlet side of the primary leg after it passes through the heat exchangers. The analog electrical signal produced by the temperature detector (86) can also be used by the PLC to vary a pneumatic controller or current-to-pressure converter (91) to automatically adjust a pneumatically controlled valve (92) to regulate the flow of secondary coolant water through the secondary side of the heat exchanger. In the event that either the PLC or the resistance-type temperature detector (86) should fail, or be deemed to have failed, a mechanical-type temperature-to-pneumatic controller (93), also connected to the primary loop outlet side of the heat exchanger will automatically activate (The PLC will be deemed to have failed if it senses a primary loop exit temperature variation at the heat exchanger outside a pre-programmed range of about 140° F. to 155° F.)

The temperature-to-pneumatic controller (93) acts as a mechanical back-up system to regulate the same pneumatically controlled valve (92) which was formerly under the control of the PLC through the current-to-pressure or I/P converter (91) in a kind of pneumatic telemetering arrangement.

In the instant invention, a temperature to pneumatic indicating controller such as Model No. 411-RF-1138 A4201A available from the Taylor Instrument Division of the Sybron Corporation of Rochester, N.Y. was used. This particular controller is capable of operating over a temperature range of 0° to 250° F. and provides a continuously variable output pressure from between 3 to 15 psi.

The operation of this kind of device can best be understood by considering the behavior of a fixed volume of gas enclosed in a Bourdon or capillary tube immersed in the primary side coolant and its response to temperature changes. Should the temperature of the primary coolant from the exit side of the heat exchangers begin to fall, then the temperature of the gas inside the tube will also decrease. This results in a reduction of its internal pressure causing the Bourdon tube to contract. This mechanical motion is then used to adjust a mechanical regulator inside the controller (93) that varies the pneumatic pressure supplied to the same pneumatically controlled valve (92) used to regulate the flow of secondary side coolant through the heat exchangers. In the event of a decreasing primary side exit temperature, the control valve (92) will be partially closed to restrict the flow rate of coolant through the secondary side. This results in less heat being transferred from the primary side of the heat exchanger to the secondary side and thus the exit temperature of the primary side begins to rise. Similarly, should the temperature of the fluid exiting the primary side of the heat exchanger begin to rise, the increased gas pressure inside the Bourdon tube will cause it to expand and the regulator will automatically increase the pressure to the pneumatically controlled valve (92) thereby causing it to open and increase the flow rate of coolant through the secondary side. This results in more heat being transferred between the primary and secondary sides thus causing the exit temperature of the primary coolant to drop.

Figure 9:
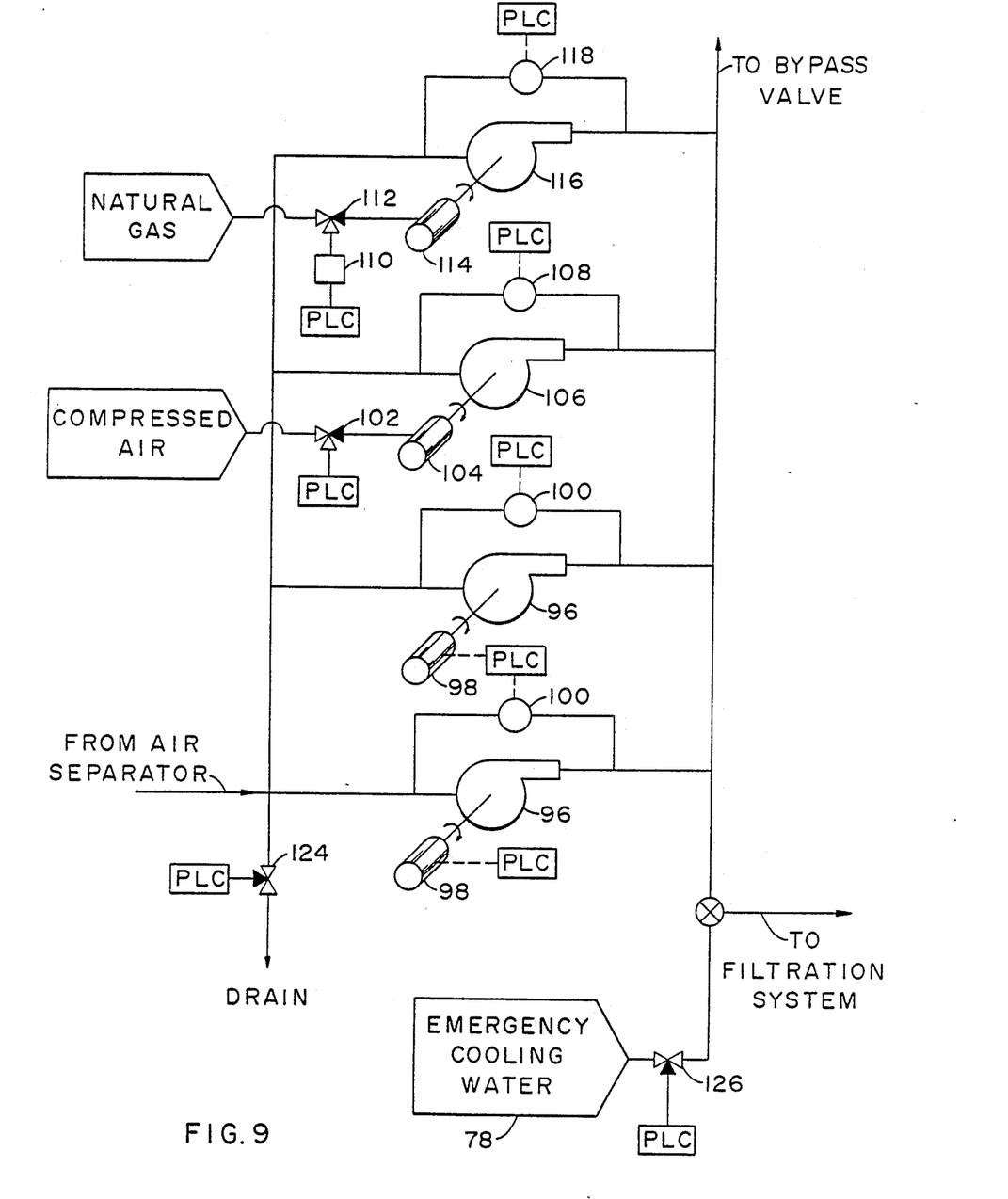
FIG. 9 depicts, in detail, the pumping apparatus described herein including the location of various transducers used to monitor the status of the system.

Turning now to FIG. 9, there is shown in greater detail the essentially fail-safe pumping system used in the instant invention to maintain a continuous flow of primary coolant throughout the fin cooler assemblies (14). At least two centrifugal pumps (96), each capable of a maximum flow rate somewhere on the order of about 350 gpm are provided. These pumps are driven by conventional electric motors (98). The supply of current to the electric motors is monitored by the PLC in order to detect a possible interruption. A differential pressure switch (100) is also provided across the inlet and exit side of each pump and monitored by the PLC to indicate the operational status of the pumps. For example, in the event that the mechanical coupling between the electric motor and impeller of the pumps were to shear, the difference in pressure across the suction and discharge side of the pump would gradually fall to somewhere between the range of 0 and 20 psi. This is interpreted by the PLC as an indication of pump failure and corrective action is automatically taken to maintain the system flow. To accomplish this, the PLC automatically opens a normally closed solenoid valve (102) to admit a supply of compressed air to an air driven motor (104). The air motor is connected to the impeller blades of a third centrifugal pump (106) capable of maintaining a flow rate of about 480 gpm. As in the case of the electrically driven pumps (96), a third differential pressure transducer (108) is also provided across the inlet and discharge side of the pump (106). In the preferred embodiment of the instant invention, compressed air is stored in two 1600-gallon pressure vessels under pressure of about 250 psi and supplied to the air motor at about 100 psi by means of a pressure reducing valve. Even though a considerable quantity of air is available, the supply is finite and thus the air-driven pump is capable of operating only for an estimated duration of about 10 minutes. To provide a backup in the event that the compressed air supply eventually becomes exhausted or is unavailable for some other reason, an engine controller (110) automatically activates a second solenoid valve (112) immediately upon the loss of electrical power or when directed by the PLC to admit a source of fuel and ignite the operation of an internal combustion engine (114). This engine is mechanically coupled to the impeller of a fourth centrifugal pump (116).

This engine-driven pump (116) is capable of discharging a flow of up to 700 gpm. The differential pressure between the suction and discharge sides is also monitored by means of a differential pressure transducer (118), the status of which is also monitored by the PLC.

The combined flow rate of primary coolant through the system is also monitored at all times by means of a pitot tube-type flow indicator (120). (See FIG. 8) Besides providing a direct indication of coolant flow, a differential pressure transducer (122) located across the tube (120) is also monitored by the PLC to activate an alarm upon the detection of a flow of less than about ½ to ⅔ of the total system design flow rate of about 700 gpm. Upon the detection of a flow rate within this range, the PLC will trigger the compressed air-driven pump (104) and also ignite the internal combustion engine-driven pump (116) to provide emergency back-up pumping.

In the event that all of the differential pressure transducers (100, 108 and 118) located across each of the four pumps indicates a pressure within the range of 0 to 20 psi, the PLC will assume that all of the primary coolant loop pumps have failed. In this case, the PLC automatically opens a first solenoid valve (124) connected to a drain and then a second solenoid valve (126) to flush emergency cooling water (78) through the system in a last attempt to maintain flow to the fins and thus avoid the subsequent distortion and possible rupture which could occur during a prolonged absence of cooling water. The electrically operated solenoid valves may also be by-passed using manually operated ones. The emergency cooling water in this case may be supplied from either a finite supply such as a storage tank or preferably brought in directly from the municipal water supply.

In the instant invention, all of the pumps used were of the centrifugal type having open impellers and stainless steel clad volutes to resist corrosion. These pumps fully meet ANSI B73.1 and B73.2 standards. Commercially available units such as Model No. 8196 available from Power Dynamics Corporation of Eagan, Minn. were used. The two electrically driven pumps were sized to deliver a flow of 350 gpm at a total dynamic head pressure (TDH) of 115 feet. These pumps were driven by conventional three-phase, 25 hp. electric motors rotating at 1750 revolutions per minute (rpm). The air-driven pump was sized to deliver a flow of 480 gpm at a TDH of 54 feet. This pump was powered by a multi-vane, 8.75 hp. compressed air motor designed to operate at 1750 rpm using 260 scfm of compressed air at 90 psi. This motor, Model No. MOV075AA is commercially available from the Ingersoll-Rand Corporation of Woodcliff Lake, N.J. The internal combustion engine-driven pump was sized to deliver 700 gpm at a TDH of 115 feet and is also available from the Power Dynamics Corporation. The natural gas driven engine, Model No. NG-1600X252 is available from the White-Hercules Corporation of Canton, Ohio and is automatically ignited by a Murphymatic (TM) Engine Controller, Model No. H-10969-8-7709 available from the Murphy Corporation of Houston, Tex. This controller (110) automatically energizes the engine (114) upon the loss of 120 volt A.C. power.

Thus, while the instant invention has been described with respect to certain specific components and preferred embodiments, it is not intended that these need necessarily be limiting in its spirit or scope. For example, various types of commercially available pressure, temperature and flow transducers, all of which are capable of providing direct or indirect analog or digital electrical signals to a commercially available programmable logic controller as described herein to monitor the output of these transducers are available and, any and all such similar devices which accomplish substantially the same results as described herein, in substantially the same way, are contemplated as well as those expressly mentioned.

For example, although the preferred embodiment of the instant invention uses a source of natural gas to provide fuel for the engine, it will be understood that any type of internal combustion engine driven by either propane, gasoline or diesel fuel may be used. Furthermore, the use of a natural gas or compressed air-driven pump is not to be interpreted as limiting since other types of emergency pumps may be used alone or in combination with one another to maintain coolant flow in the event of an electrical failure.

It will also be understood that numerous other components described herein such as air separators, pumps, holding tanks, valves, demineralization beds, and electrically activated solenoid valves may also be sized to accommodate other closed-loop pressurized systems for cooling the thermal environment of glass fiber forming on an industrial scale and that, therefore, the particular dimensions and capacities described herein are not to be interpreted as limiting in this particular application of the instant invention except insofar as recited in our accompanying claims.

Accordingly, we claim:

1. In a method for cooling glass fibers formed from molten glass flowing from a heated fiber glass bushing assembly wherein cooling is accomplished by the transfer of heat to a primary coolant flowing in a primary side of a closed-loop cooling system and subsequently removed to a flow of secondary coolant through at least one heat exchanger having both a primary and secondary side to accommodate the flow of said primary and secondary coolant, the improvement comprising: electronically monitoring the temperature of said primary coolant at a location downstream of said at least one heat exchanger to produce a first electrical signal representative of the temperature of said primary coolant; converting said electrical signal into a measure of temperature; comparing the temperature so measured by means of a programmable controller to a range of pre-programmed temperature limits; and, forwarding a second electrical signal from said programmable controller to a second electronic controller whereby the flow rate of coolant through the secondary side of said at least one heat exchanger is adjusted so as to maintain the temperature of said primary coolant within said pre-scribed range of pre-programmed temperature limits.

2. The method of claim 1 wherein the range of pre-programmed temperatures is between 140° F. and 155° F.

3. The method of claim 1, the improvement further comprising: controlling the flow rate of secondary coolant through the secondary side of said at least one heat exchange by a mechanical controller in the event that said pre-programmed range of primary coolant temperature limits are exceeded or upon the failure of said programmable controller.

4. The method of claim 1, the improvement further comprising: monitoring pressure of said primary coolant; and, injecting primary make-up coolant into the primary side of said closed-loop system when the pressure in said primary coolant drops below a preset pressure limit.

5. The method of claim 4 wherein said preset pressure limit is between 16 and 18 psi.

6. The method of claim 1, the improvement further comprising: passing said primary coolant through an air separator so as to deaerate any air or vapor entrained in said primary coolant.

7. A pumping system and cooling system having a primary and secondary side for maintaining the substantially constant flow of a primary coolant throughout a primary side of a closed-loop cooling system for cooling glass fibers, said fibers formed from molten glass flowing from a heated fiber glass bushing assembly wherein cooling is accomplished by the extraction of heat radiated to the primary side of said closed-loop cooling system, said cooling system having at least one fin cooler assembly per bushing, each said at least one fin cooler assembly having a header block and a plurality of fins attached thereto, said header block and fins also having a continuous passageway to permit the flow of said primary coolant therethrough whereby heat radiated to the surface of each said fin is transferred to said primary coolant and subsequently removed to a flow of secondary coolant through at least one heat exchanger, said pumping system comprising: at least one compressed air-driven pump; an electrically operated valve connected to said at least one compressed air-driven pump, said valve being in a normally closed position; at least one electrically driven pump; and, means for monitoring electrical current supplied to said at least one electrically driven pump whereupon the detection of an interruption in said electrical current causes said electrically operated valve to open and admit compressed air into said at least one compressed air-driven pump thereby causing said pump to operate and maintain a substantially constant flow of primary coolant throughout the primary side of said closed-loop cooling system.

8. The pumping system of claim 7 further comprising: means for electronically monitoring the pressure differential across said at least one electrically driven pump whereupon the detection of a pressure differential of between 0 and 20 psi also causes said electrically operated valve to open and admit compressed air into said at least one air-driven pump thereby causing said pump to operate and maintain a substantially constant flow of primary coolant throughout the primary side of said closed-loop cooling system.

9. The pumping system of claim 7 further comprising: means for electronically monitoring the flow rate of primary coolant through the primary side of said closed-loop cooling system whereupon the detection of a flow rate of less than about $\frac{1}{2}$ to $\frac{2}{3}$ of the net capacity of said at least one electrically driven pump also causes said electrically operated valve to open and admit compressed air to said at least one compressed air-driven pump thereby causing said pump to operate and maintain a substantially constant flow of primary coolant through out the primary side of said closed-loop cooling system.

10. The pumping system of claim 7 further comprising: means for electronically monitoring the pressure of the flow of primary coolant in the primary side of said closed-loop system whereupon the detection of a pressure less than about $\frac{2}{3}$ of the pressure at which primary coolant is usually maintained also causes said electrically operated valve to open and admit compressed air to said at least one air-driven pump thereby causing said pump to operate and maintain a substantially constant flow of primary coolant throughout the primary side of said closed-loop cooling system.

11. The pumping system of claim 7 further comprising: an internal combustion engine; a pump operatively coupled to said engine and caused to be driven thereby; and, means for engaging the operation of said engine at about the same time the valve for admitting compressed air to said at least one air-driven pump is opened whereby a substantially constant flow of primary coolant is maintained throughout the primary side of said closed-loop cooling system.

12. The pumping system of claim 7 further comprising: a source of emergency coolant furnished at a sufficient hydrostatic head to maintain a substantially continuous flow of emergency coolant throughout the primary side of said closed-loop system; and second electrically operated valve connecting said source of emergency coolant to the primary side of said closed-loop system, said valve being held in a normally closed position; a third electrically operated valve for opening a return drain; and, means for electrically opening said second and third electrically operated valves in the event of the detection of a triggering event whereby emergency coolant is admitted into the primary side of said closed-loop cooling system.

13. The pumping system of claim 12 further comprising a manually operated valve to bypass each said electrically operated valve if a triggering event occurs and said electrically operated valves fail to open.

14. The method of claim 5, the improvement further comprising: generating a first electrical signal representative of the pressure of said make-up coolant by means of a pressure transducer; providing said first electrical signal to a programmable controller; activating an alarm when the pressure of said make-up coolant falls below about 16 psi; and, activating a valve which opens to admit a supply of emergency coolant into the primary side of said closed-loop system.

* * * * *